Feb. 23, 1943.  C. M. JOHNSON  2,311,835

AUTOMATIC LID-OPERATING DEVICE

Filed May 24, 1941

Inventor
Charles Morrison Johnson
By
Attorney

Patented Feb. 23, 1943

2,311,835

UNITED STATES PATENT OFFICE 2,311,835

AUTOMATIC LID-OPERATING DEVICE

Charles Morrison Johnson, Tacoma, Wash.

Application May 24, 1941, Serial No. 395,051

1 Claim. (Cl. 312—152)

This invention relates to kitchen furnishings and especially to the receptacle adapted to receive the garbage incident to kitchen operation, and has for its objects to provide means for keeping the lid of such receptacle closed when stowed away and for automatically opening the said lid when the receptacle is brought out from such stowed position. Further objects of my invention are to provide means, to accomplish the said objects, of extreme simplicity and which can be placed on the market at low cost.

I attain these and other objects by the devices, mechanisms, and arrangements illustrated in the accompanying drawing, in which—

Figure 2:
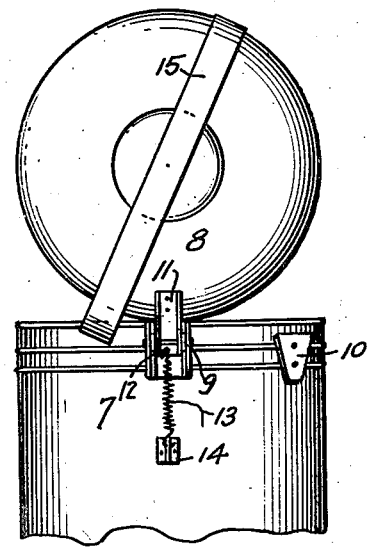
Figure 1:
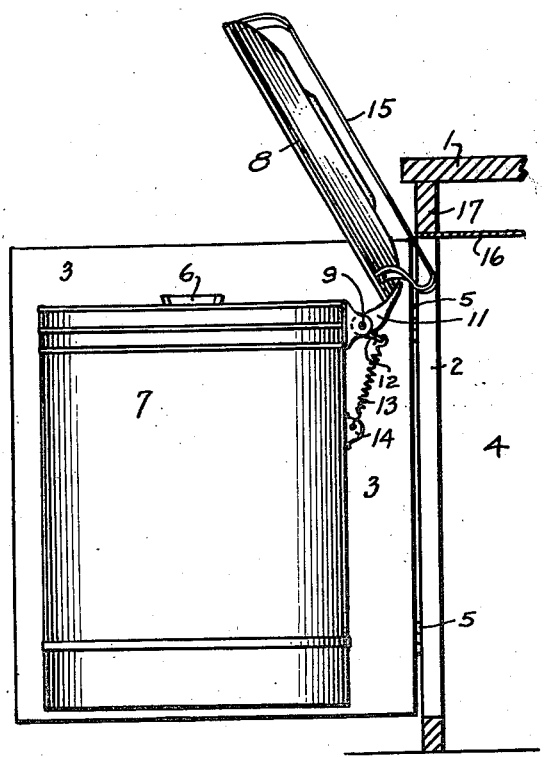
Figure 5:
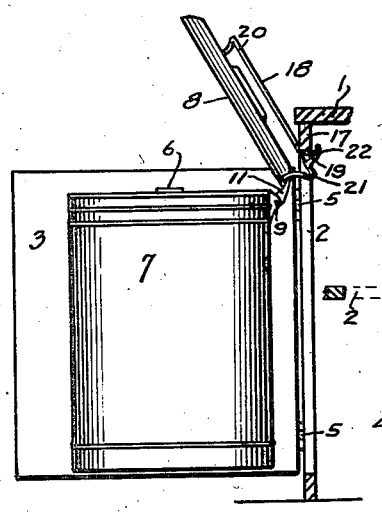
Figures 3, 4:
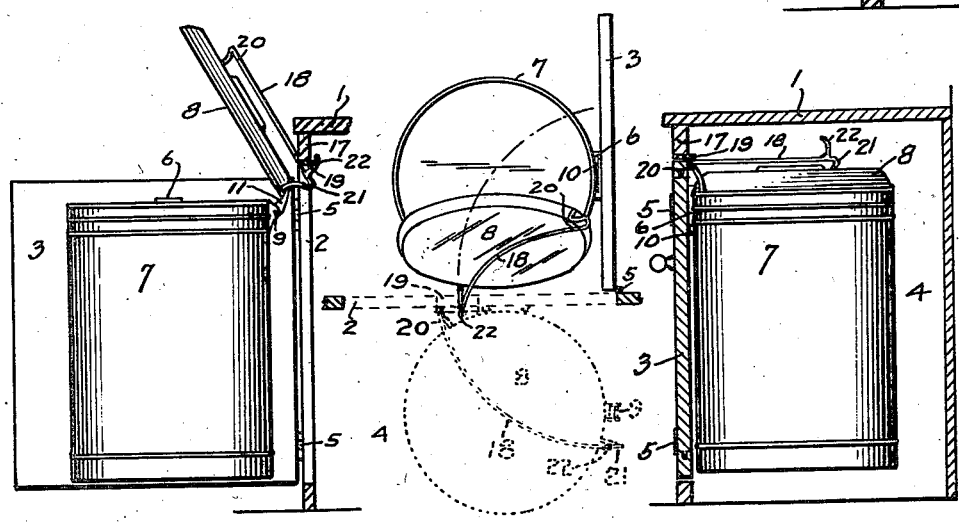

Fig. 1 is a side elevation, partly in section, showing the receptacle withdrawn from its stowed position and with the lid open; Fig. 2 is a rear elevation of the upper part of the receptacle, with its lid open; Fig. 3 is a section of the kitchen furnishing, with the receptacle stowed therein, and with a variation of my improved operating means; Fig. 4 is a plan view thereof, with the top of the cabinet removed showing, in full lines, the receptacle in removed position and, in dotted lines, the receptacle in stowed position; and Fig. 5 is a view similar to Fig. 1 also showing the variation in the operating means.

Similar numerals of reference refer to similar parts throughout the several views.

In modern kitchens it is customary to provide cabinet furnishings built into the kitchen, said cabinet work providing covered portions adapted to receive dishes and the various kitchen utensils and appliances. It is also common to provide a receptacle for the receipt of garbage and trash, said receptacle usually standing on the kitchen floor, under the sink, or in other convenient place. The said garbage receptacle is usually of double construction, having an inner removable container into which the garbage may be scraped and which may be lifted out from the outer receptacle to empty the garbage therefrom. This outer receptacle is provided with a lid, thereby confining the garbage odors and fumes therein.

It is the object of this invention to support the said outer receptacle on a movable portion of the built-in cabinet work, preferably on a door, though a drawer may be used, in such position that, when the door is closed, the receptacle is stowed away and the lid thereof is pressed down thereon and that, when the door is open, the receptacle is removed from inside the cabinet and the lid thereof is automatically raised therefrom.

Referring to Figs. 1 and 2, the built-in cabinet work is represented by the table-top 1, the front of the cabinet having an opening 2 in which a door 3 swings to close the compartment 4 under the top 1. The door 3 is provided with the usual vertical hinges 5 to enable it to swing horizontally. A V-shaped socket 6 is secured in suitable position on the inner side of the door 3.

The receptacle 7, which encloses the garbage container, comprises a cylindrical body, and is provided with a lid 8 connected thereto by a hinge 9 whereby access is had to the container therein. The receptacle 7 is provided with a V-shaped lug 10 secured to its side in such position as to be substantially at right-angles radially from the hinge 9, said lug 10 being adapted to be slipped into the V-shaped socket 6 on the inner side of the door 3, thereby removably securing the receptacle 7 to the inner side of the door. The hinge 9 is offset a short distance out from the side of the receptacle 7 and is connected to the lid 8 by means of an arm 11, and this arm 11 is provided with a hook or lug 12. A spring 13 is secured to the receptacle 7 by a lug 14, and extends therefrom to said lug 12 on the arm 11; the above parts being arranged so that the spring 13 always tends to raise the lid 8 from off the top of the receptacle 7.

The lid 8 is provided with a substantially flat hold-down spring 15, secured to the lid at its ends and lying well above the lid. A bearing plate 16 is secured to the under side of the front board 17 of the cabinet, in the door-opening 2, said plate extending horizontally inward therefrom and being adapted to press downward on the spring 15 and thus to hold the lid 8 tightly down on the receptacle 7, against the action of the spring 13 which tends to raise the lid.

When the door 3 is closed, the receptacle 7 is supported thereon within the space 4 and the lid 8 is closed thus preventing the escape of the garbage odors and fumes. But, as the door 3 is opened, the spring 15 moves forward with the receptacle 7, sliding under the plate 16 until the pin of the hinge 9 passes out from under the said plate when the action of the spring 13 on the lid 8 is no longer opposed by the spring 15 and the plate 16, thus permitting it to raise the lid 8 from off the receptacle so that refuse may be placed in the container therein. A stop (not shown) may be provided to prevent the lid 8 from swinging beyond its vertical position. Upon closing the door 3, the spring 15 engages the plate 16 and forces the lid to be closed as soon as the hinge 9 has passed under the plate 16, as above described.

The fact that the spring 15 engages the plate 16 resiliently, allows a slight variation in the height of the receptacle 7 in relation to the door 3, or to the said plate 16, thus facilitating the mounting of the above-described parts on the cabinet.

Referring, now, to Figs. 3, 4 and 5, it will be seen that the receptacle 7 is supported on the door 3 in the same manner as above described and that it is provided with a lid 8 hinged thereto. It is not, however, provided with any spring corresponding with the above-described spring 13. The lid 8 is provided with spring hold-down wire 18 which is secured at its ends to the lid and is supported above the lid. The bearing plate 19 is secured to the underside of the front board 17 but is much smaller than the above-described bearing plate 16. The shape of the hold-down wire 18, as seen in plan (Fig. 4) is preferably arcuate, having, ideally, its center in the central axis of the door hinges 5, though a slight variation in its shape and position is allowed for in the breadth of the bearing plate 19. The outer end of the wire 18 is extended at 20 so as to engage the plate 19 when the door 3 is closed (as seen in dotted lines in Fig. 4), and its inner end 21 is extended and provided with a hook or lug 22 extending upward therefrom and adapted to engage the inner edge of the bearing plate 19 when the door 3 is almost fully open, whereby a further opening of the door 3 will cause the lid 8 to swing on its hinge 9, to open the receptacle as above described. As soon as the door 3 starts to be closed, the lid 8 swings down thereon to close the receptacle and the spring wire 18 engages the plate 19 to press it tightly thereon in all positions of the door 3 after the lid has once been replaced on the receptacle.

Thus it will be seen that both forms of my invention keep the garbage can firmly closed at all times except when it has been completely withdrawn from the compartment under the table top, and that when so withdrawn the lid is automatically raised to permit the insertion of refuse therein.

Having described my invention, what I claim and desire to secure by Letters Patent, is:

In an automatic lid-operating device, the combination with a fixed structure having a compartment therein; of a movable portion mounted thereon and adapted to open or close said compartment; a bearing plate mounted on said fixed structure in the opening therein and extending into said compartment; a receptacle mounted on said movable portion and lying within said compartment when said movable portion is in normal closed position; a lid hingedly mounted on said receptacle; a substantially flat hold-down spring mounted on and over said lid and pressed down by said bearing plate when said movable portion is in closed position; and spring means engaging said lid to raise it when said receptacle has been moved to remove said hold-down spring from contact with said bearing plate.

CHARLES MORRISON JOHNSON.